US012580610B2

(12) United States Patent
Chen et al.

(10) Patent No.: US 12,580,610 B2
(45) Date of Patent: Mar. 17, 2026

(54) RECONFIGURABLE INTELLIGENT SURFACE (RIS) ANTENNA AND RIS ANTENNA UNIT

(71) Applicant: INDUSTRIAL TECHNOLOGY RESEARCH INSTITUTE, Hsinchu (TW)

(72) Inventors: Chiung-Hsiung Chen, Jhudong Township (TW); Jiun-Jang Yu, Hsinchu City (TW); Chu-Hung Li, Taoyuan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 62 days.

(21) Appl. No.: 18/660,633

(22) Filed: May 10, 2024

(65) Prior Publication Data

US 2025/0112671 A1      Apr. 3, 2025

Related U.S. Application Data

(60) Provisional application No. 63/541,910, filed on Oct. 2, 2023.

(30) Foreign Application Priority Data

Dec. 14, 2023    (TW) ................................. 112148715

(51) Int. Cl.
*H04B 7/04*        (2017.01)
*H01Q 1/38*        (2006.01)
*H01Q 15/14*       (2006.01)

(52) U.S. Cl.
CPC .......... *H04B 7/04013* (2023.05); *H01Q 1/38* (2013.01); *H01Q 15/148* (2013.01)

(58) Field of Classification Search
CPC .... H04B 7/04013; H01Q 1/38; H01Q 15/148; H01Q 3/44
See application file for complete search history.

(56) References Cited

U.S. PATENT DOCUMENTS

| | | | |
|---|---|---|---|
| 2011/0163600 A1 | 7/2011 | Garb et al. | |
| 2020/0381824 A1 | 12/2020 | Kao et al. | |

(Continued)

FOREIGN PATENT DOCUMENTS

| | | |
|---|---|---|
| CN | 115732937 A | 3/2023 |
| CN | 116250151 A | 6/2023 |

(Continued)

OTHER PUBLICATIONS

Taiwanese Office Action and Search Report for Taiwanese Application No. 112148715, dated Dec. 23, 2024.

(Continued)

*Primary Examiner* — Seung H Lee
(74) *Attorney, Agent, or Firm* — Birch, Stewart, Kolasch & Birch, LLP

(57) ABSTRACT

A reconfigurable intelligent surface (RIS) antenna includes an RIS antenna body and a bias circuit. The RIS antenna body includes a plurality of RIS antenna units. The bias circuit is electrically coupled to the RIS antenna units of the RIS antenna body. Each RIS antenna unit includes: a metal pattern, a dielectric substrate and a control unit. The metal pattern and the control unit are formed on the dielectric substrate. The metal pattern has a resonance frequency. The control unit includes at least one metal oxide resistive element. The control unit is electrically coupled to the metal pattern and the bias circuit for changing the resonance frequency of the metal pattern by adjusting a bias applied by the bias circuit.

16 Claims, 5 Drawing Sheets

(56)  References Cited

U.S. PATENT DOCUMENTS

| | | | |
|---|---|---|---|
| 2022/0059943 A1 | 2/2022 | Saab et al. | |
| 2023/0043800 A1 | 2/2023 | Khojastepour et al. | |
| 2023/0208479 A1 | 6/2023 | Wang et al. | |
| 2023/0402763 A1 * | 12/2023 | Xie | H01Q 3/46 |
| 2024/0195458 A1 * | 6/2024 | Oh | H04B 7/04013 |

FOREIGN PATENT DOCUMENTS

| | | | | |
|---|---|---|---|---|
| CN | 116367303 A | 6/2023 | | |
| TW | 202234752 A | 9/2022 | | |
| TW | 202310498 A | 3/2023 | | |
| TW | 202321717 A | 6/2023 | | |
| WO | WO-2023282299 A1 * | 1/2023 | | H01Q 3/46 |

OTHER PUBLICATIONS

Taiwanese Office Action and Search Report for Taiwanese Application No. 112148715, dated May 27, 2025, with partial translation.

* cited by examiner

RECONFIGURABLE INTELLIGENT SURFACE (RIS) ANTENNA AND RIS ANTENNA UNIT

This application claims the benefit of U.S. provisional application Ser. No. 63/541,910, filed Oct. 2, 2023, and Taiwan application Serial No. 112148715, filed Dec. 14, 2023, the subject matters of which are incorporated herein by references.

TECHNICAL FIELD

The disclosure relates in general to a reconfigurable intelligent surface (RIS) antenna and an antenna unit thereof.

BACKGROUND 5G millimeter wave communication belongs to the fifth-generation mobile communication technology, which performs communication using millimeter wave band. Millimeter waves refer to the electromagnetic waves whose wavelengths are within the range of 1~10 millimeters. In comparison to conventional wireless communication band, millimeter wave communication, having a higher frequency and a wider transmission bandwidth, provides faster data transfer speeds and greater network capacity.

The importance of 5G millimeter wave communication is embodied in the following aspects: (1) Higher transmission rate: In comparison to the communication technology of the prior art, 5G millimeter wave communication can provide faster data transfer speeds and support more application scenarios, such as HD video streaming, virtual reality (VR), and augmented reality (AR). (2) Greater network capacity: Millimeter wave communication, having a wider frequency range, can support more user equipment connecting to the Internet at the same time without decreasing network performance, and such feature is crucial to the Internet connection of a large amount of equipment in future operation of the Internet of Things (IoT). (3) Lower delay: 5G millimeter wave communication can implement a lower transmission delay, which is crucial to applications with high immediacy requirements, such as intelligent transportation system, telemedicine, and industrial automation. (4) Promotion and development of new applications: The introduction of 5G millimeter wave communication facilitates the development of many new applications, including smart city, smart transportation, and smart manufacturing, increases quality of life, and promotes economic development.

Despite having the abovementioned advantages, 5G millimeter wave communication also faces some challenges. For instance, the transmission distance of millimeter waves is relatively shorter and has faster signal attenuation due to the interruption of obstacles. Therefore, the deployment of 5G millimeter wave communication must fully take these factors into considerations, so that reliable and stable transmission can be assured.

Signal transmission of 5G millimeter waves can be easily shielded; moreover, high deployment cost of active small base station has become a key bottleneck to the development of 5G communication. To increase signal coverage, currently the development of wireless communication is promoted through the deployment of reconfigurable intelligent surface (RIS) antennas. By adjusting the state of each RIS antenna unit of an RIS antenna, the reflective angle of electromagnetic waves can be adjusted, and signal coverage can be increased.

RIS is a new wireless communication technology, which improves the performance of the wireless communication system using smart adjustment function. An RIS antenna is formed of many adjustable elements and capable of adjusting scattering properties according to communication needs.

Apart from being used in wireless communication system, such as radio frequency system and wireless communication network, the RIS technology can further be used to adjust and manipulate the broadcasting of electromagnetic waves. By changing surface reflective properties, the RIS technology can eliminate multipath effect, increase signal intensity and spectrum efficiency, and improve overall communication performance.

The RIS technology has many advantages. For instance, it provides higher energy efficiency, lower communication delay, and better privacy and security. Besides, the RIS technology can further increase the capacity of existing wireless network without using additional spectrum resource.

Thus, the RIS technology will play a significant role in the wireless communication system, particularly in the regards of wireless network capacity and limited spectrum resources.

SUMMARY

According to an embodiment of the present disclosure, a reconfigurable intelligent surface (RIS) antenna is provided. The RIS antenna includes an RIS antenna body and a bias circuit. The RIS antenna body includes a plurality of RIS antenna units. The bias circuit is electrically coupled to the RIS antenna units of the RIS antenna body. Each RIS antenna unit includes: a metal pattern, a dielectric substrate and a control unit. The metal pattern and the control unit are formed on the dielectric substrate. The metal pattern has a resonance frequency. The control unit includes at least one metal oxide resistive element. The control unit is electrically coupled to the metal pattern and the bias circuit for changing the resonance frequency of the metal pattern by adjusting a bias applied by the bias circuit.

According to another embodiment of the present disclosure, a reconfigurable intelligent surface (RIS) antenna unit is provided. The RIS antenna unit includes: a metal pattern, a dielectric substrate and a control unit. The metal pattern and the control unit are formed on the dielectric substrate. The metal pattern has a resonance frequency. The control unit includes at least one metal oxide resistive element. The control unit is electrically coupled to the metal pattern for changing the resonance frequency of the metal pattern by adjusting a received bias.

The above and other aspects of the disclosure will become better understood with regard to the following detailed description of the preferred but non-limiting embodiment(s). The following description is made with reference to the accompanying drawings.

US 12,580,610 B2

3

Figure 5A:
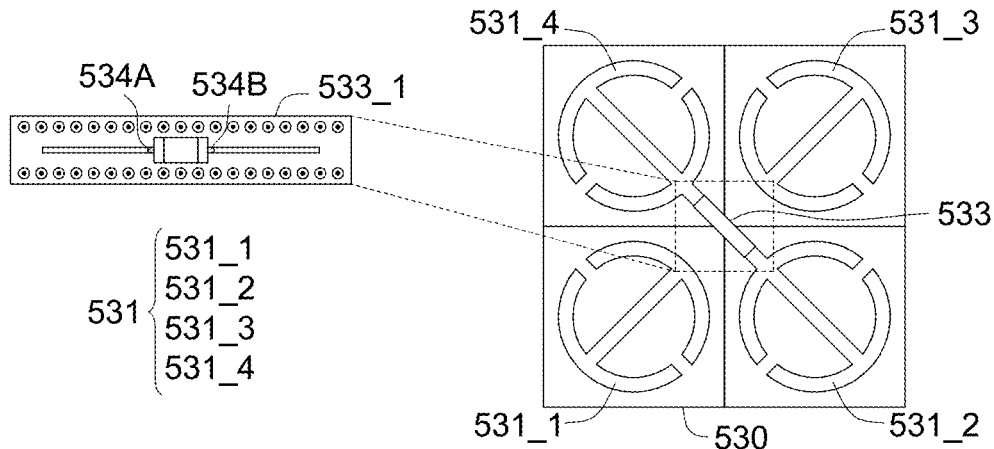

FIG. 5A is a schematic diagram of an RIS antenna unit according to an embodiment of the disclosure.

Figure 5B:
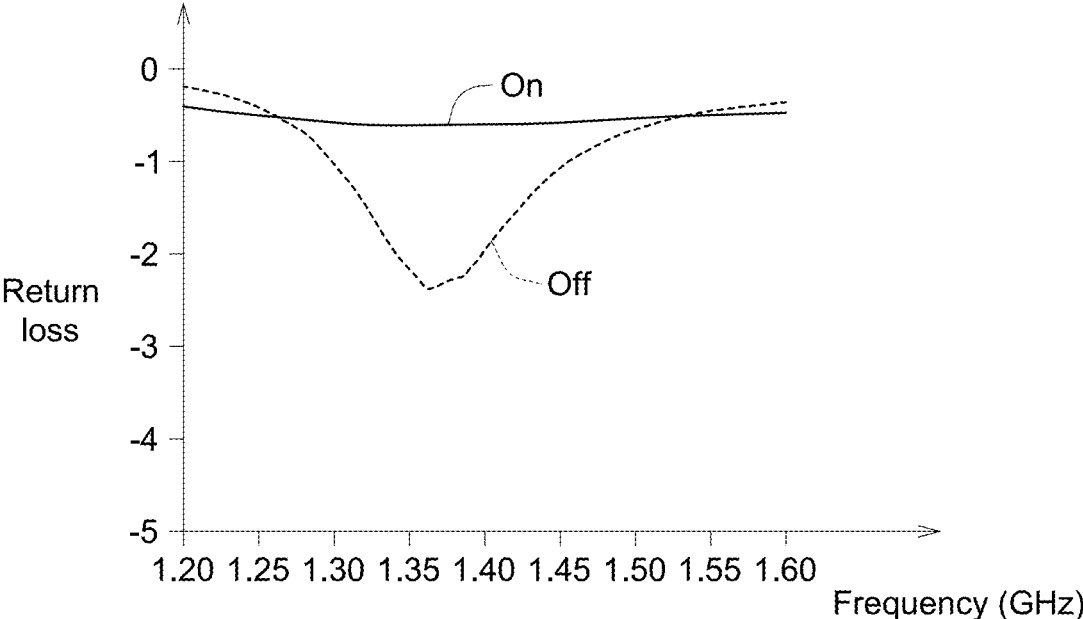

FIG. 5B is a return loss chart of an RIS antenna unit according to an embodiment of the disclosure.

DETAILED DESCRIPTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
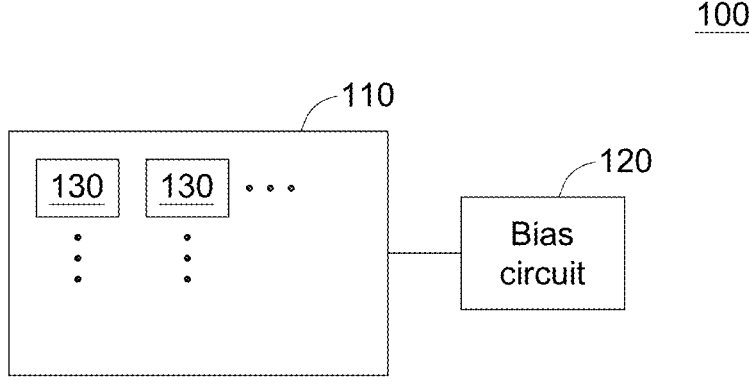
FIG. 1 is a schematic diagram of an RIS antenna according to an embodiment of the disclosure.

Referring to FIG. 1, a schematic diagram of an RIS antenna according to an embodiment of the disclosure is shown. As indicated in FIG. 1, the RIS antenna 100 according to an embodiment of the disclosure includes: an RIS antenna body 110 and a bias circuit 120. The RIS antenna body 110 is electrically coupled to the bias circuit 120. The RIS antenna body 110 includes a plurality of RIS antenna units 130. Each RIS antenna unit 130 is electrically coupled to the bias circuit 120. In a possible embodiment of the disclosure, the RIS antenna body 110 includes 30*30 RIS antenna units 130 arranged in an array. However, the disclosure is not limited thereto. In other possible embodiments of the disclosure, the RIS antenna body 110 may include other quantities of RIS antenna units 130, and/or, the RIS antenna units 130 can be arranged in other shapes. The said arrangements are within the spirit of the disclosure.

Figures 2A, 2B:
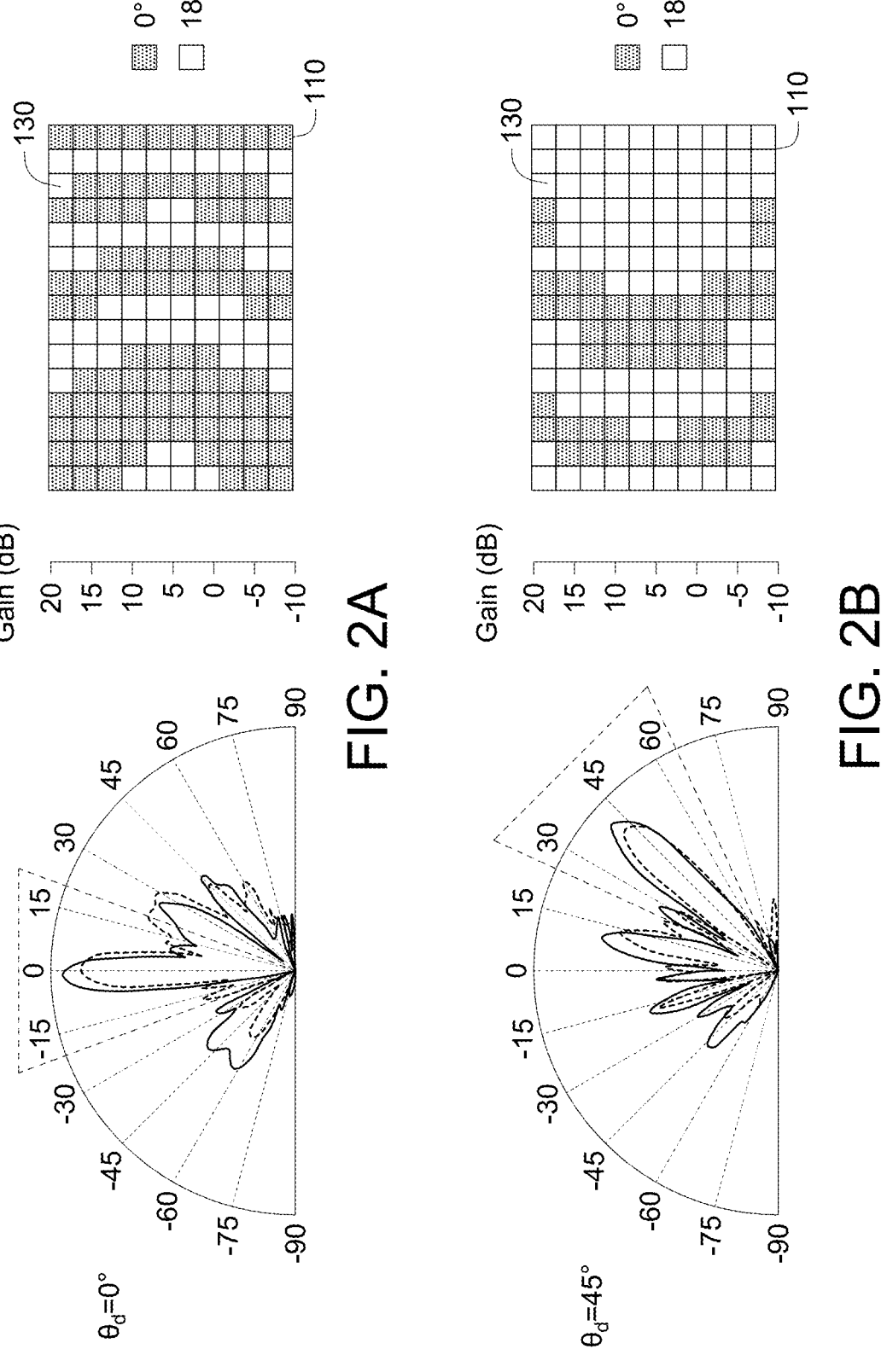
FIG. 2A and FIG. 2B are radiation pattern diagrams of the RIS antenna according to an embodiment of the disclosure.

FIG. 2A and FIG. 2B are radiation pattern diagrams of an RIS antenna 100 according to an embodiment of the disclosure. In an embodiment of the disclosure, by changing the state of the RIS antenna unit 130 (such as biased state (ON) or unbiased state (OFF)), the radiation pattern and radiation angle ($\theta$d) of the RIS antenna 10 can be changed. In FIG. 2A, the radiation angle ($\theta$d) is 0°; in FIG. 2B, the radiation angle ($\theta$d) is 45°.

Figure 3:
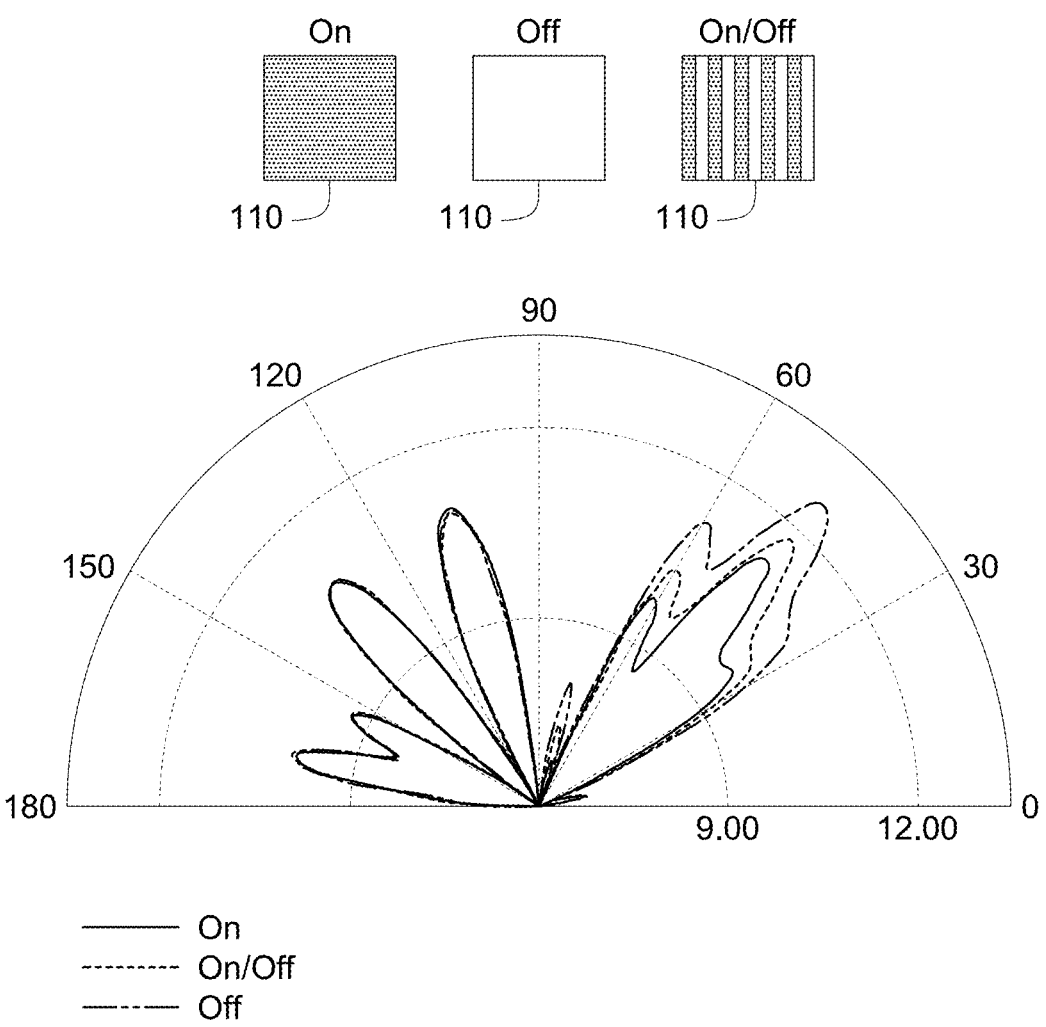
FIG. 3 is another radiation pattern diagram of the RIS antenna according to an embodiment of the disclosure.

FIG. 3 is another radiation pattern diagram of the RIS antenna 100 according to an embodiment of the disclosure. In FIG. 3, the radiation patterns obtained under three different states are illustrated. The three states are as follows: all-biased state (On), all-unbiased state (Off), and half-biased-half-unbiased state (On/Off). The all-biased state (On) refers to the state where all RIS antenna units 130 of the RIS antenna 100 receive a bias from the bias circuit 120. The all-unbiased state (Off) refers to the state where none of the RIS antenna units 130 of the RIS antenna 100 receive a bias from the bias circuit 120 (that is, not any RIS antenna units 130 receive a bias). The half-biased-half-unbiased state (On/Off) refers to the state where a half of the RIS antenna units 130 of the RIS antenna 100 receive a bias from the bias circuit 120 but the other half of the RIS antenna units 130 do not receive a bias from the bias circuit 120 (for instance, while the RIS antenna units 130 in odd-numbered columns receive a bias, the RIS antenna units 130 in even-numbered columns do not receive a bias).

As indicated in FIG. 3, by changing the state of the RIS antenna units 130 (such as biased state (ON) or unbiased state (OFF)), the RIS antenna 100 can change the radiation pattern and radiation angle.

Figure 4:
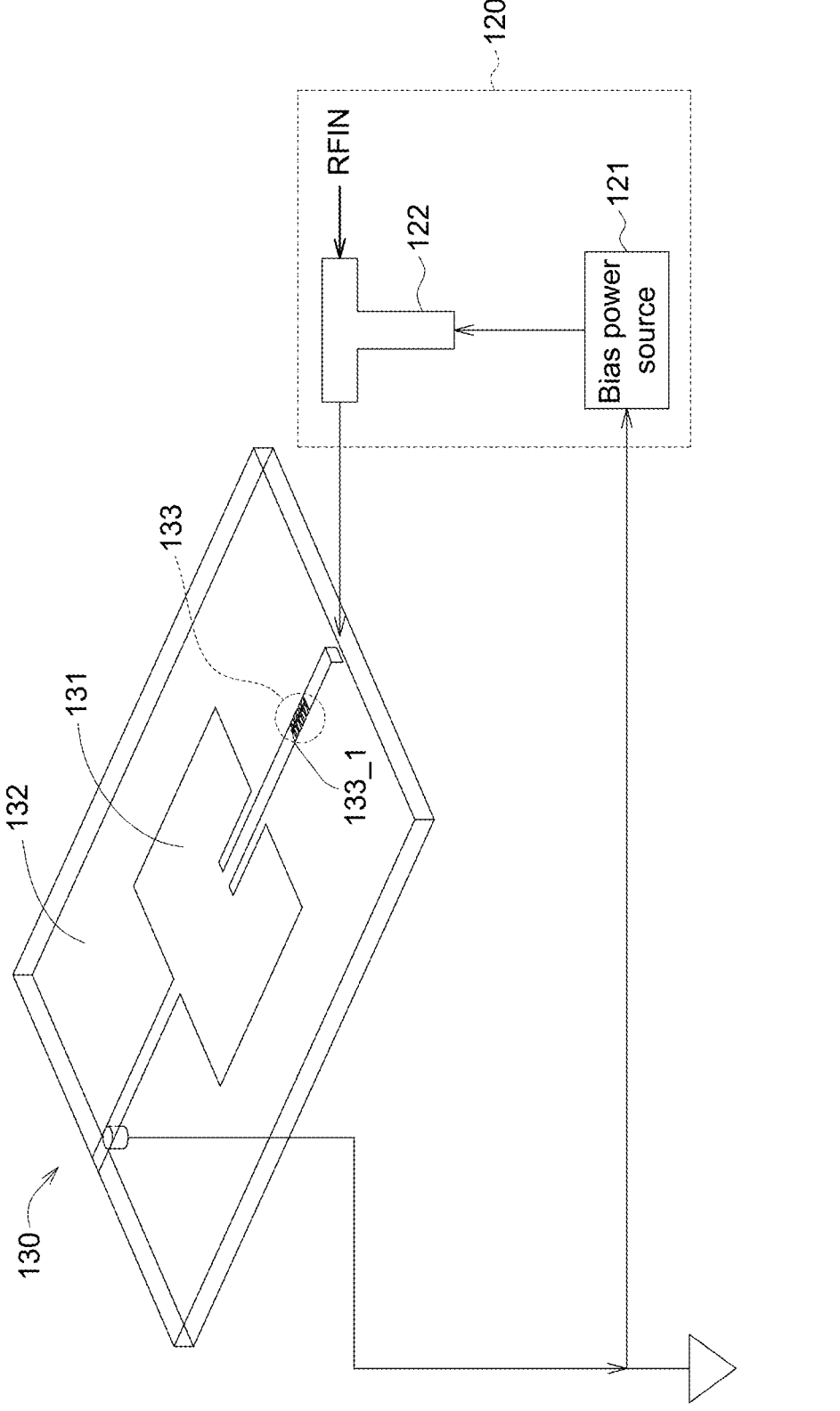
FIG. 4 is a schematic diagram of an RIS antenna unit according to an embodiment of the disclosure.

FIG. 4 is a schematic diagram of the RIS antenna unit 130 according to an embodiment of the disclosure. As indicated in FIG. 4, the RIS antenna unit 130 includes: a metal pattern 131, a dielectric substrate 132, and a control unit 133. The bias circuit 120 includes a bias power source 121 and a plurality of isolation circuits 122.

The metal pattern 131 is made of a metal material. The pattern of the metal pattern 131 of FIG. 4 is for exemplary purpose only, not for limiting other possible embodiments of the disclosure. In other possible embodiments of the disclosure, the metal pattern 131 can have other possible patterns, and the said arrangements are still within the spirit of the disclosure.

The metal pattern 131 is formed on the dielectric substrate 132. The substrate material of the dielectric substrate 132 has dielectric properties and can be realized by such as a copper clad laminate (CCL) substrate, a low temperature co-fired ceramic (LTCC) substrate, or a flexible board (such as a polyimide (PI) board, a polyethylene terephthalate (PET) board, or a polypropylene (PP) board). The CCL substrate is a substrate whose surface has a layer of copper foil. The CCL substrate is a basis material, which provides mechanical support and electrical coupling. The ceramic substrate is made of a specific ceramic material, which provides superior electrical performance and high temperature resistance. The flexible board (PI, PET, PP) is made of a thinner and softer substrate material, which provides better flexibility and bending.

The control unit 133 includes at least one metal oxide resistive element 133_1. The control unit 133 includes a plurality of metal oxide resistive elements 133_1 connected in series. The control unit 133 is formed on the dielectric substrate 132. The metal oxide resistive elements 133_1 are metal compound semiconductor elements and pertain to passive elements. When the metal oxide resistive elements 133_1 are biased, the resistance will decrease. In an embodiment of the disclosure, based on the property that the resistance of biased metal oxide resistive elements 133_1 will decrease, the required state switching effect of RIS can be achieved and the signal reflective properties can be adjusted (by changing the radiation pattern and radiation angle).

The metal oxide resistive elements 133_1 of the control unit 133 are electrically coupled to the metal pattern 131 and the bias circuit 120. By adjusting the bias applied to the bias circuit 120, the resonance property (such as the resonance frequency) of the metal pattern 131 can be changed. The biasing of each RIS antenna unit 130 is independently controlled.

The bias circuit 120 includes a bias power source 121 and a plurality of isolation circuits 122. Each isolation circuit 122 is electrically coupled to the metal pattern 131 of the RIS antenna units 130. The isolation circuits 122 are for isolating bias (a DC current) and the radio frequency signal RFIN. In an illustrative rather than restrictive sense, an inductor is serially connected to a bias feeder so that the RF signal RFIN will not enter the bias circuit 120. Moreover, the capacitance at the junction between the RF circuit (not illustrated) and the bias circuit 120 is increased, so that the bias will not enter the RF circuit.

In an embodiment of the disclosure, the metal patterns 131 have a resonance frequency, wherein, the metal patterns 131 are arranged in an array, and a minimum length of an array size of the arranged array is equivalent to or greater than two times of the wavelength of resonance frequency (the two times can also be referred as an established multiple).

FIG. 5A is a schematic diagram of an RIS antenna unit 530 according to an embodiment of the disclosure. FIG. 5B is a return loss chart of the RIS antenna unit 530 according to an embodiment of the disclosure. As indicated in FIG. 5A, inside the RIS antenna unit 530, the metal pattern 531 is electrically coupled to the metal oxide resistive element 533_1 of the control unit 533. For the convenience of illustration, only one metal oxide resistive element 533_1 is illustrated in FIG. 5A. However, it should be understood that the disclosure is not limited thereto.

In FIG. 5A, the metal pattern 531 of the RIS antenna unit 530 includes four resonators 531_1~531_4, wherein resonators 531_2 and 531_4 are connected to the control unit 533 in series. Thus, electromagnetic waves of the RIS antenna unit 530 can change under different biases.

The metal oxide resistive element 533_1 has two electrical coupling terminals 534A and 534B electrically coupled to the metal pattern 533.

The bias power source 121 of the bias circuit 120 applies a bias to the electrical coupling terminals 534A and 534B of the metal oxide resistive element 533_1 through the metal pattern 533, wherein, the range of bias is such as between 1V~100V but is not limited thereto.

In an embodiment of the disclosure, the metal oxide resistive element is made of a material selected from one of the following materials including but not limited to zinc oxide (ZnO), cadmium oxide (CdO), indium tin oxide (ITO), tin dioxide ($SnO_2$), titanium dioxide ($TiO_2$), barium titanate ($BaTiO_3$), barium zirconate titanate (BZT).

As indicated in FIG. 5B, ON represents return loss measured when the RIS antenna unit receives a bias from the bias circuit; OFF represents return loss measured when the bias circuit does not provide the bias to the RIS antenna unit. When the RIS antenna unit receives a bias from the bias circuit, the metal oxide resistive element has a capacitance value of 5.2 pF and a resistance of 42 ohm. When the bias circuit does not provide the bias to the RIS antenna unit, the metal oxide resistive element has a capacitance value of 6.8 pF and a resistance of 2.7K ohm. Thus, when the RIS antenna unit switches to the ON state, radio signals will be reflected by the RIS antenna unit; when the RIS antenna unit switches to the OFF state, radio signals will pass through the RIS antenna unit. It can be known from FIG. 5B that in an embodiment of the disclosure, the resonance frequency of the metal pattern is about 1.4 GHz.

In the RIS antenna according to an embodiment of the disclosure, specific metal patterns are arranged in an array for reflecting electromagnetic wave signals. The RIS antenna includes a control unit with variable impedance; the impedance of the control unit can be adjusted through external voltage control, so that the angle at which RIS antenna reflects electromagnetic waves can be dynamically adjusted. In an embodiment of the disclosure, the metal oxide resistive elements are voltage controlled; as the metal oxide resistive elements receive an external bias, impedance will change, and the reflective angle of the RIS antenna will be adjusted.

The control unit of a conventional RIS antenna unit is formed of PIN-type diodes or varactor diodes, which incur a higher cost. In an embodiment of the disclosure, the control unit of the RIS antenna unit, formed of metal oxide resistive elements, adjusts the surface state of the RIS by controlling resistance change, and element cost is greatly decreased. That is, in an embodiment of the disclosure, the problem of the RIS antenna incurring higher cost can be effectively resolved through design integration of lower cost elements.

Many specific details are described in the present disclosure. However, these specific details should not be interpreted as restrictions of the scope of protection of the claims; rather, they should be regarded as descriptions of the features of specific implementations. In the disclosure, a sub-combination of some features described in the context of a single embodiment can be implemented in one single embodiment. Conversely, various features described in the context of one single embodiment can be implemented in one or a suitable sub-combination of several embodiments. Initially, the descriptions may suggest that some features would function only when they are included in some combinations, and such combinations may even be specified. However, under some circumstances, one or some features can be deleted from the said combinations, which are related to one specific sub-combination or variations thereof. Similarly, although the operations of the method are illustrated in a specific order, it does not mean that these operations must be executed according to the illustrated order or that all illustrated operations must be executed in order to achieve desired results.

The above embodiments of the disclosure only disclose some examples and implementations. However, based on the disclosed contents, modifications, adjustments, and improvements can be made to the above examples, implementations, and other possible implementations.

While the invention has been described by way of example and in terms of the preferred embodiment(s), it is to be understood that the invention is not limited thereto. Based on the technical features embodiments of the present disclosure, a person ordinarily skilled in the art will be able to make various modifications and similar arrangements and procedures without breaching the spirit and scope of protection of the invention. Therefore, the scope of protection of the present disclosure should be accorded with what is defined in the appended claims.

What is claimed is:

1. A reconfigurable intelligent surface (RIS) antenna, comprising:
    an RIS antenna body, comprising a plurality of RIS antenna units; and
    a bias circuit electrically coupled to the RIS antenna units of the RIS antenna body,
    wherein,
    each RIS antenna unit comprises: a metal pattern, a dielectric substrate and a control unit,
    the metal pattern and the control unit are formed on the dielectric substrate,
    the metal pattern has a resonance frequency,
    the control unit comprises at least one metal oxide resistive element, and
    the control unit is electrically coupled to the metal pattern and the bias circuit for changing the resonance frequency of the metal pattern by adjusting a bias applied by the bias circuit.

2. The RIS antenna according to claim 1, wherein, when the bias circuit applies the bias to the at least one metal oxide resistive element, a resistance of the at least one metal oxide resistive element decreases.

3. The RIS antenna according to claim 1, wherein, whether each RIS antenna unit receives the bias is independently controlled.

4. The RIS antenna according to claim 1, wherein, the bias circuit comprises a bias power source and a plurality of isolation circuits,
    each isolation circuit is electrically coupled to the metal pattern of the RIS antenna units,
    the isolation circuit isolates bias and a radio frequency signal.

5. The RIS antenna according to claim 1, wherein, the metal pattern of the RIS antenna unit comprises a plurality of resonators, and a part of the resonators are connected to the control unit in series.

6. The RIS antenna according to claim 1, wherein, the control unit comprises a plurality of metal oxide resistive elements connected in series.

7. The RIS antenna according to claim 1, wherein, the at least one metal oxide resistive element has a plurality of electrical coupling terminals electrically coupled to the metal pattern, the bias circuit applies the bias to the electrical coupling terminals of the at least one metal oxide resistive elements through the metal pattern.

8. The RIS antenna according to claim 1, wherein, the bias applied by the bias circuit is between 1V~100V.

9. The RIS antenna according to claim 1, wherein, the at least one metal oxide resistive element is made of a material selected from one of the following materials: zinc oxide (ZnO), cadmium oxide (CdO), indium tin oxide (ITO), tin dioxide ($SnO_2$), titanium dioxide ($TiO_2$), barium titanate ($BaTiO_3$), barium zirconate titanate (BZT).

10. The RIS antenna according to claim 1, wherein, the metal patterns of the RIS antenna units are arranged in an array, and a minimum length of an array size of the arranged array is equivalent to or greater than two times of a wavelength of the resonance frequency.

11. A reconfigurable intelligent surface (RIS) antenna unit, comprising:
a metal pattern, a dielectric substrate and a control unit, wherein

8 the metal pattern and the control unit are formed on the dielectric substrate,
the metal pattern has a resonance frequency,
the control unit comprises at least one metal oxide resistive element, and
the control unit is electrically coupled to the metal pattern for changing the resonance frequency of the metal pattern by adjusting a received bias.

12. The RIS antenna unit according to claim 11, wherein, when receiving the bias, a resistance of the at least one metal oxide resistive element decreases.

13. The RIS antenna unit according to claim 11, wherein, the metal pattern of the RIS antenna unit comprises a plurality of resonators, and a part of the resonators are connected to the control unit in series.

14. The RIS antenna unit according to claim 11, wherein, the control unit comprises a plurality of metal oxide resistive elements connected in series.

15. The RIS antenna unit according to claim 11, wherein, the at least one metal oxide resistive element has a plurality of electrical coupling terminals electrically coupled to the metal pattern, the bias is applied to the electrical coupling terminals of the at least one metal oxide resistive elements through the metal pattern.

16. The RIS antenna unit according to claim 11, wherein, the at least one metal oxide resistive element is made of a material selected from one of the following materials: zinc oxide (ZnO), cadmium oxide (CdO), indium tin oxide (ITO), tin dioxide ($SnO_2$), titanium dioxide ($TiO_2$), barium titanate ($BaTiO_3$), barium zirconate titanate (BZT).

* * * * *